US012651493B2

(12) United States Patent
Kashiwai

(10) Patent No.: US 12,651,493 B2
(45) Date of Patent: Jun. 9, 2026

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventor: Tadahiro Kashiwai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 124 days.

(21) Appl. No.: 18/529,224

(22) Filed: Dec. 5, 2023

(65) Prior Publication Data

US 2024/0194007 A1 Jun. 13, 2024

(30) Foreign Application Priority Data

Dec. 7, 2022 (JP) ................................ 2022-195556

(51) Int. Cl.
*G07C 5/08* (2006.01)
*B60K 35/00* (2024.01)

(52) U.S. Cl.
CPC .................................. *G07C 5/085* (2013.01)

(58) Field of Classification Search
CPC ............................... G07C 5/085; B60K 35/00
USPC ....................................................... 701/33.4
See application file for complete search history.

(56) References Cited

U.S. PATENT DOCUMENTS 9,180,788 B2 * 11/2015 Harumoto ............. B60W 10/24
2007/0005237 A1 * 1/2007 Needham ........... G01C 21/3469 701/123
2010/0030437 A1 * 2/2010 Kim .................... F16H 61/0213 701/65
2011/0160990 A1 * 6/2011 Mineta ............... G01C 21/3469 701/123
2012/0065871 A1 * 3/2012 Deshpande .......... G08G 1/0133 701/118
2012/0232783 A1 * 9/2012 Calkins .............. G01C 21/3469 701/411
2012/0283940 A1 * 11/2012 Smith .................. G07C 5/0825 701/123
2016/0349075 A1 * 12/2016 Son .................... G01C 21/3469
2020/0143691 A1 * 5/2020 Sidiropoulos ............ G08G 5/20
2025/0198776 A1 * 6/2025 Phillips .............. G01C 21/3469

FOREIGN PATENT DOCUMENTS

JP H11-180185 A 7/1999
JP 2002-350152 A 12/2002
JP 2013-130496 A 7/2013

* cited by examiner

*Primary Examiner* — Tyler D Paige
(74) *Attorney, Agent, or Firm* — Dinsmore & Shohl LLP

(57) ABSTRACT

An information processing apparatus acquires first data about an amount of fuel or power consumed when a first vehicle passes through a first road segment. Furthermore, the information processing apparatus acquires second data about amounts of fuel or power consumed when a plurality of second vehicles pass through the first road segment. Then, the information processing apparatus generates a result of comparing the fuel or power consumption amounts in the first road segment, between the first vehicle and the plurality of second vehicles, based on the first and second data, and maps the result of the comparison on the first road segment on a road map.

15 Claims, 13 Drawing Sheets

| DATE AND TIME | VEHICLE ID | VEHICLE ATTRIBUTE | ROAD SEGMENT | FUEL CONSUMPTION AMOUNT |
|---|---|---|---|---|
| ... | V001 | ... | S001 | 6cc |
| ... | V001 | ... | S002 | 5cc |
| ... | ... | ... | ... | ... |

Fig. 3

| ROAD SEGMENT | EVALUATION VALUE | RANK |
|---|---|---|
| SEGMENT A | 50 | B |
| SEGMENT B | 60 | A |
| SEGMENT C | 40 | C |
| SEGMENT D | 70 | A |
| ... | ... | ... |

Fig. 8

INFORMATION PROCESSING APPARATUS AND INFORMATION PROCESSING METHOD

CROSS REFERENCE TO THE RELATED APPLICATION

This application claims the benefit of Japanese Patent Application No. 2022-195556, filed on Dec. 7, 2022, which is hereby incorporated by reference herein in its entirety.

BACKGROUND

Technical Field

The present disclosure relates an information processing apparatus.

Description of the Related Art

An onboard apparatus capable of outputting fuel efficiency information about vehicles has been widespread. In connection therewith, for example, Patent Literature 1 discloses an onboard apparatus that evaluates and outputs fuel efficiency of the own vehicle taking into account traveling distance, road type, congestion situation, and the like.

CITATION LIST

Patent Literature

Patent Literature 1: Japanese Patent Laid-Open No. 11-180185

SUMMARY

An object of the present disclosure is to relatively evaluate the fuel efficiency of a vehicle.

One aspect of an embodiment of the present disclosure may be an information processing apparatus including a controller, the controller being configured to execute: acquiring first data about an amount of fuel or power consumed when a first vehicle passes through a first road segment; acquiring second data about amounts of fuel or power consumed when a plurality of second vehicles pass through the first road segment; and generating a result of comparing the fuel or power consumption amounts in the first road segment, between the first vehicle and the plurality of second vehicles, based on the first and second data, and mapping the result of the comparison on the first road segment on a road map.

One aspect of an embodiment of the present disclosure may be an information processing apparatus including a controller, the controller being configured to execute: acquiring, from each of a plurality of vehicles, first data indicating a position of each vehicle and second data about an amount of fuel or power consumed by each vehicle, and storing the first and second data into a database; accepting a specification of one or more first road segments from a first apparatus associated with the first vehicle; and extracting, from the database, third data about an amount of fuel or power consumed by a second vehicle in the one or more first road segments, and transmitting the third data to the first apparatus.

One aspect of an embodiment of the present disclosure may be an information processing method to be executed by a computer, wherein the information processing method includes: acquiring first data about an amount of fuel or power consumed when a first vehicle passes through a first road segment; acquiring second data about amounts of fuel or power consumed when a plurality of second vehicles pass through the first road segment; and generating a result of comparing the fuel or power consumption amounts in the first road segment, between the first vehicle and the plurality of second vehicles, based on the first and second data, and mapping the result of the comparison on the first road segment on a road map.

As another aspect, a program for causing a computer to execute the above method or a computer-readable storage medium that non-transitorily stores the program is given.

According to the present disclosure, it is possible to relatively evaluate the fuel efficiency of a vehicle.

BRIEF DESCRIPTION OF THE DRAWINGS

FIG. 3 illustrates an example of fuel efficiency information generated by an onboard apparatus;

FIG. 8 is a diagram illustrating an evaluation value calculated for each road segment;

DESCRIPTION OF THE EMBODIMENTS

Figure 1:
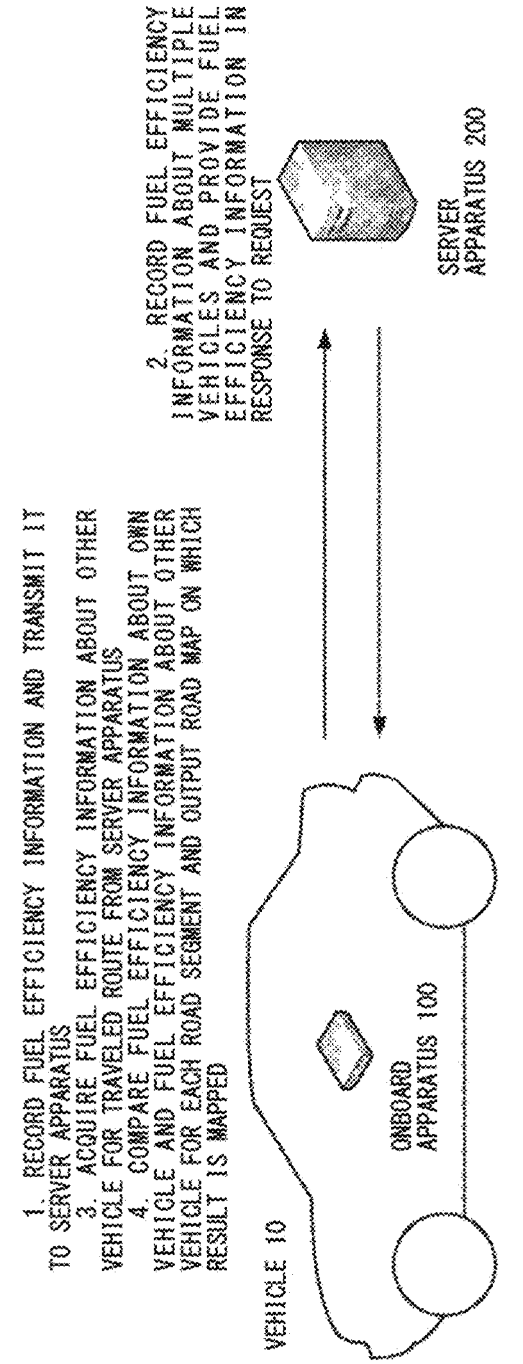
FIG. 1 is a schematic diagram of a vehicle system according to an embodiment.

Recently, onboard apparatuses capable of outputting fuel efficiency information about the own vehicles have been widespread. The fuel efficiency information is calculated, for example, as an average value of fuel consumption amounts per distance. The average value of fuel consumption amounts can be reset at a predetermined timing. Thereby, a fuel efficiency for any section can be measured.

Furthermore, an onboard apparatus capable of mapping fuel efficiency information about the own vehicle on a map is known. Thereby, it is possible to visualize in which section what level of a fuel efficiency is obtained.

However, since a conventional onboard apparatus outputs fuel efficiency information about a vehicle alone, a driver of a certain vehicle cannot know whether or not they perform fuel-efficient driving in comparison with other drivers. In order to solve this problem, it is necessary to collect pieces of fuel efficiency information about a plurality of vehicles that traveled the same section and evaluate the fuel efficiency of the own vehicle based on the pieces of fuel efficiency information.

An information processing apparatus according to the present disclosure solves the problem.

An information processing apparatus according to one aspect of the present disclosure may include a controller configured to execute: acquiring first data about an amount of fuel or power consumed when a first vehicle passes through a first road segment; acquiring second data about amounts of fuel or power consumed when a plurality of second vehicles pass through the first road segment; and generating a result of comparing the fuel or power consumption amounts in the first road segment, between the first vehicle and the plurality of second vehicles, based on the first and second data, and mapping the result of the comparison on the first road segment on a road map.

The road segment is such that is obtained by dividing a road that the first vehicle can travel into a plurality of sections. The road segment may be a road link that couples road nodes (branch points) or may be such that is obtained by subdividing a road link.

The first data may be data indicating the amount of fuel or power consumed when the first vehicle passes through the first road segment. When the information processing apparatus is mounted on the first vehicle, the first data can be acquired from an electronic control unit of the own vehicle. Alternatively, when the information processing apparatus is a sever apparatus, the first data may be received from the first vehicle by wireless communication.

The second data may be data about the fuel or power consumption amounts of the plurality of vehicles (the second vehicles) in the same road segment. The plurality of second vehicles may be a plurality of vehicles different from the first vehicle or may be a plurality of vehicles including the first vehicle.

For example, the second data can be a set of fuel or power consumption amounts of the plurality of second vehicles in the first road segment.

The controller may compare the fuel or power consumption amounts (hereinafter, referred to simply as "consumption amounts") in the first road segment, between the first vehicle and the second vehicles, based on the first and second data. The comparison can be made, for example, based on "how many cc of fuel each of the first vehicle and the second vehicles consumed in the first road segment".

Since the plurality of second vehicles are targeted, an average value or a deviation value may be used for the comparison. For example, after determining an average value of consumption amounts of the plurality of second vehicles, a ratio between the average value and the consumption amount of the first vehicle may be determined. Alternatively, after determining a variance of the consumption amounts of the plurality of second vehicles, a deviation of the consumption amount of the first vehicle may be determined. Alternatively, a percentile of the consumption amount of the first vehicle relative to the consumption amounts of the plurality of second vehicles may be determined.

The fuel or power efficiency of the first vehicle can be relatively evaluated by the above methods.

The controller may map the result of the comparison on a road map. For example, when making a comparison for a certain road segment, the controller may generate a graphic corresponding to the result of the comparison and overlay the graphic on the target road segment. The graphic may be, for example, such that indicates a degree of favorableness of the comparison result in color. Thereby, it is possible to easily grasp a section where fuel or power efficiency is relatively favorable and a section where it is not relatively favorable.

Furthermore, the controller may select the second data to be used for the comparison.

In the case of comparing fuel or power consumption amounts, it is desirable that conditions among vehicles, for example, vehicle models, vehicle sizes, drive systems, and the like are the same. Therefore, vehicles having the same attribute as the first vehicle may be selected as the second vehicles to acquire second data corresponding to the vehicles.

Alternatively, vehicles that traveled the first road segment under the same situation as the first vehicle may be selected as the second vehicles. Matching of conditions, such as day of the week, time zone, and date, can improve the accuracy of the comparison.

The controller may provide the road map on which the comparison result is mapped, to an occupant of the first vehicle. The road map may be outputted via a display device or may be transmitted to an external apparatus (for example, a computer carried by the occupant).

Furthermore, the controller may compare amounts of fuel or power consumed in a section with a predetermined length including a second road segment, between the first vehicle and the plurality of second vehicles, and map the result of the comparison on the road map as the comparison result about the second road segment.

If a comparison of fuel efficiency is made for each road segment when the distance of each road segment is short (for example, 100 m), there is a possibility that the evaluations varies among the short sections, and results are difficult to see. Therefore, a section for which a comparison is actually made may be set longer than a road segment for which a comparison result is to be displayed. For example, when road segments A, B, and C are lined up in that order, an evaluation may be made based on an amount of fuel consumed in the three sections A to C, and the result of the evaluation may be mapped on the road segment B. Thereby, the evaluation results are smoothed, and the road map after the mapping is easy to see.

Specific embodiments of the present disclosure will be described below based on drawings. A hardware configuration, a module configuration, a function configuration, and the like described in each embodiment are not intended to limit the technical scope of the disclosure only thereto unless otherwise stated.

First Embodiment

An outline of a vehicle system according to a first embodiment will be described with reference to FIG. 1. The vehicle system according to the present embodiment is configured including a vehicle 10, mounted with an onboard apparatus 100, and a server apparatus 200. The vehicle system may include a plurality of vehicles 10 (and onboard apparatuses 100).

The vehicle 10 is a vehicle that is mounted with the onboard apparatus 100 and is capable of providing information about a fuel consumption amount (fuel efficiency) for an occupant.

The onboard apparatus 100 stores an amount of fuel consumed during traveling for each traveled road segment, and transmits the stored information to the server apparatus.

In the description below, information in which any road segment and an amount of fuel consumed in the road segment are associated will be referred to as "fuel efficiency information".

Pieces of fuel efficiency information transmitted from the plurality of vehicles 10 are accumulated in the server apparatus 200 and are provided for any vehicle 10 in response to a request.

When the vehicle 10 ends traveling, the onboard apparatus 100 outputs information about the fuel efficiency of the traveling.

At this time, the onboard apparatus 100 acquires fuel efficiency information about another vehicle from the server apparatus 200. The fuel efficiency information includes fuel efficiency information about the other vehicle that traveled one or more road segments that the vehicle 10 has traveled. The onboard apparatus 100 compares the fuel efficiency of the own vehicle and the fuel efficiency of the other vehicle based on the stored fuel efficiency information about the own vehicle and the fuel efficiency information about the other vehicle acquired from the server apparatus 200, and maps the result of the comparison on a road map.

Thereby, the driver of the vehicle 10 can recognize how fuel-efficient driving they perform in comparison with the other vehicle.

Components constituting the system will be described.

The vehicle 10 is a connected car having a function of communicating with an external network. The vehicle 10 is configured including the onboard apparatus 100 and an electronic control unit (also referred to as an ECU).

Figure 2:
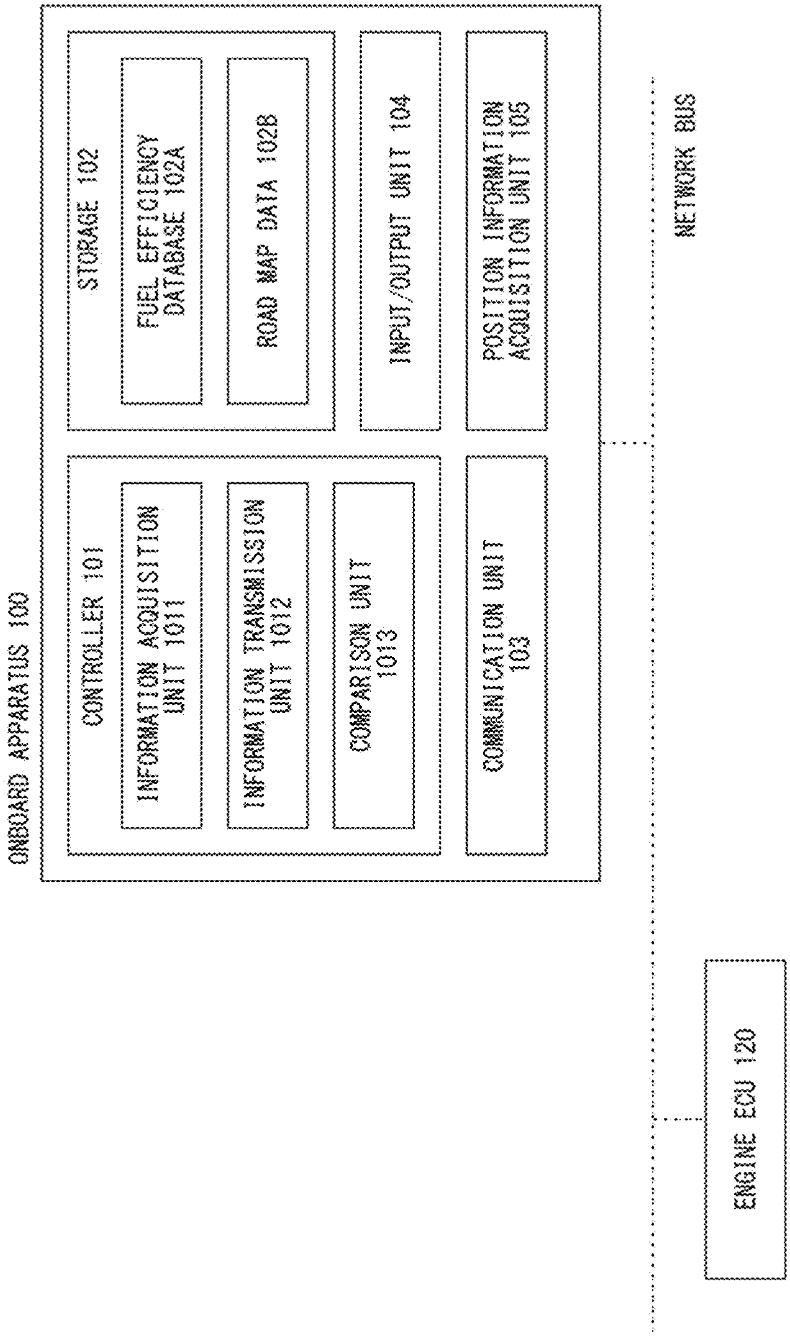
FIG. 2 is a diagram illustrating components of a vehicle according to the embodiment.

FIG. 2 is a diagram illustrating components of the vehicle 10 according to the present embodiment. The vehicle 10 according to the present embodiment is configured including the onboard apparatus 100 and an engine ECU 120.

Though a single ECU is exemplified in the present example, the vehicle 10 may include a plurality of ECUs responsible for different vehicle components. As the plurality of ECUs, for example, a body ECU, a hybrid ECU, and a power train ECU can be exemplified. The ECUs may be divided according to functions. For example, the ECUs may be divided into an ECU that executes a security function, an ECU that executes an automatic parking function, an ECU that executes a remote control function, and the like.

First, the engine ECU 120 will be described.

The engine ECU 120 is an electronic control unit that controls drive-system components of the vehicle 10. The engine ECU 120 has a function of periodically communicating with the drive-system components via an onboard network.

The engine ECU 120 can be configured as a computer that includes processors such as a CPU and a GPU, main memories such as a RAM and a ROM, and auxiliary storage devices such as an EPROM, a disk drive, and a removable medium.

The engine ECU 120 is configured to be capable of communicating with a fuel injection device of the vehicle 10 to acquire a fuel consumption amount. The engine ECU 120 can acquire, for example, a liquid volume (cc) of fuel consumed per unit time.

The vehicle 10 may include a plurality of ECUs. The plurality of ECUs may be ECUs that control components of different systems, for example, a body system, an electric system, and a power train system, respectively.

Next, the onboard apparatus 100 will be described.

The onboard apparatus 100 is an apparatus that provides information for the occupant of the vehicle (for example, a car navigation apparatus). The onboard apparatus 100 is also referred to as a car navigation apparatus, an infotainment apparatus, or a head unit. It is possible to provide navigation or entertainment for the occupant of the vehicle by the onboard apparatus 100.

The onboard apparatus 100 has a function of performing wireless communication with an external network. The onboard apparatus 100 may have a function of downloading traffic information, road map data, music, video and the like by communication with the external network of the vehicle 10. The onboard apparatus 100 may be an apparatus capable of cooperating with a smartphone or the like.

The onboard apparatus 100 can be configured as a computer that includes processors such as a CPU and a GPU, main memories such as a RAM and a ROM, and auxiliary storage devices such as an EPROM, a hard disk drive, and a removable medium. In the auxiliary device, an operating system (OS), various kinds of programs, various kinds of tables, and the like are stored, and functions meeting predetermined purposes as described later can be realized by executing the programs stored in the auxiliary device. A part or all of the functions, however, may be realized by a hardware circuit like an ASIC and an FPGA.

The onboard apparatus 100 is configured including a controller 101, a storage 102, a communication unit 103, an input/output unit 104, and a position information acquisition unit 105.

The controller 101 is an operation unit that realizes various kinds of functions of the onboard apparatus 100 by executing a predetermined program. The controller 101 may be realized, for example, by a CPU.

The controller 101 is configured including three function modules of an information acquisition unit 1011, an information transmission unit 1012, and a comparison unit 1013. Each function module may be realized by executing a stored program by the CPU.

The information acquisition unit 1011 periodically acquires data indicating a fuel consumption amount per unit time from the engine ECU 120. Furthermore, the information acquisition unit 1011 acquires information about a road segment that the vehicle 10 is traveling from the position information acquisition unit 105 to be described later, and then generates fuel efficiency information by associating the road segment with the fuel consumption amount. Hereinafter, the fuel efficiency information about the own vehicle will be referred to as own-vehicle fuel efficiency information.

The fuel efficiency information may be generated, for example, each time the vehicle 10 enters a new road segment.

FIG. 3 illustrates an example of the fuel efficiency information generated by the information acquisition unit 1011. As illustrated, the fuel efficiency information is configured including fields of date and time, vehicle ID, vehicle attribute, road segment, and fuel consumption amount.

In the date and time field, information about a date and time when the information is generated is stored. In the vehicle ID field, an identifier unique to the vehicle is stored. In the vehicle attribute field, information about an attribute of the vehicle 10 is stored. As the attribute of the vehicle 10, for example, vehicle type, model name, vehicle size, vehicle weight, fuel type, or a drive method is exemplified. In the road segment field, an identifier of a road segment that the vehicle 10 traveled is stored. In the fuel consumption amount field, a value indicating an amount of fuel consumed in the road segment is stored.

The fuel efficiency information generated by the information acquisition unit 1011 is stored in a fuel efficiency database 102A of the storage 102.

The information transmission unit 1012 transmits the fuel efficiency information generated by the information acquisition unit 1011 to the server apparatus 200.

Transmission of the fuel efficiency information may be performed each time the vehicle 10 enters a new road segment or at a timing when the vehicle 10 ends traveling (for example, at a timing when the vehicle system is shut down).

By acquiring and comparing the fuel efficiency information about the own vehicle and the fuel efficiency information about other vehicle, the comparison unit 1013 calculates a value of evaluation about whether the own vehicle is fuel-efficient or not for each of a plurality of road segments that the vehicle 10 has traveled.

Specifically, the comparison unit 1013 identifies a plurality of road segments included in a route that the own vehicle has traveled, and acquires pieces of own-vehicle fuel efficiency information corresponding to the identified road segments from the fuel efficiency database 102A. Furthermore, the comparison unit 1013 acquires pieces of fuel efficiency information generated by a plurality of other vehicles that traveled the road segments (hereinafter, other-vehicle fuel efficiency information) from the server apparatus 200.

Figure 4:
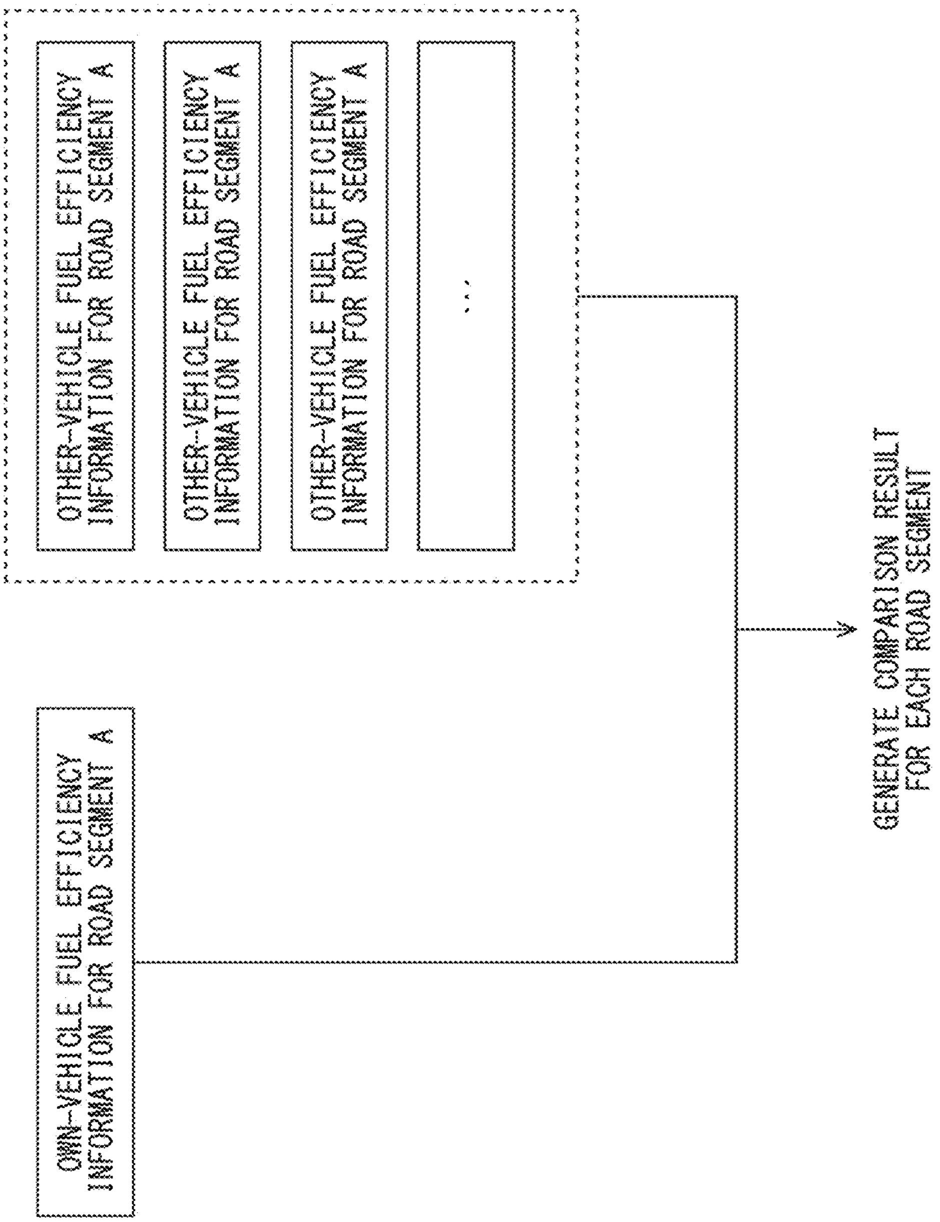
FIG. 4 is a diagram illustrating a method for comparing fuel efficiencies.

FIG. 4 is a diagram illustrating a relationship between the own-vehicle fuel efficiency information and the other-vehicle fuel efficiency information acquired by the comparison unit 1013. As illustrated, for the same road segment, the comparison unit 1013 acquires the own-vehicle fuel efficiency information and the pieces of other-vehicle fuel efficiency information generated by the plurality of other vehicles. Then, by comparing them, an evaluation value that evaluates "how favorable the fuel efficiency of the own vehicle is in comparison with the plurality of other vehicles".

A method for generating the evaluation value will be described later.

Furthermore, the comparison unit 1013 generates a graphic based on the calculated evaluation value, and outputs the graphic by superimposing the graphic on the corresponding road segment on a road map. It is desirable that the graphic is such that the evaluation value calculated for each road segment can be intuitively understood.

For example, the comparison unit 1013 may generate the graphic in a warm color if the fuel efficiency of the own vehicle is better in comparison with the other vehicles and generate the graphic in a cold color if the fuel efficiency of the own vehicle is worse in comparison with the other vehicles to superimpose the graphic on the corresponding road segment on the road map. Thereby, it is possible to visualize whether the fuel efficiency of the own vehicle is relatively good or bad in comparison with the other vehicles.

In the description below, a road map on which a graphic corresponding to an evaluation value is superimposed on a road segment will be referred to as a "fuel efficiency map".

The storage 102 is for storing information and is configured with a storage medium such as a RAM, a magnetic disk, or a flash memory. In the storage 102, various kinds of programs executed by the controller 101, data used by the programs, and the like are stored. Furthermore, the fuel efficiency database 102A described before and road map data 102B are stored in the storage 102.

The fuel efficiency database 102A is a database in which the fuel efficiency information described with reference to FIG. 3 is stored.

The road map data 102B is map data of roads that the vehicle 10 can travel. The road map data 102B may include definitions of road segments.

The communication unit 103 is a communication interface for connecting the onboard apparatus 100 to the bus of the onboard network and the server apparatus 200.

The communication unit 103 may include an interface for performing CAN (controller area network) communication in the vehicle.

Furthermore, the communication unit 103 may include an antenna and a communication module for performing wireless communication with the outside. The antenna is an antenna element that performs input/output of a wireless signal. In the present embodiment, the antenna is compatible with mobile communication (for example, mobile communication of 3G, 4G, 5G, and the like). The communication module is a module for performing mobile communication.

An input/output unit 104 is for accepting an input operation performed by the user and presenting information to the user. Specifically, the input/output unit 104 is configured with a touch panel and control unit therefor, and a liquid crystal display and control unit therefor. In the present embodiment, the touch panel and the liquid crystal display are configured with one touch panel display. The input/output unit 104 may include a unit for outputting voice (an amplifier and a speaker), a unit for inputting voice (a microphone), and the like.

The position information acquisition unit 105 acquires position information about the vehicle 10 and identifies a road segment that the vehicle 10 is traveling. The position information acquisition unit 105 includes a GPS antenna and a positioning module for obtaining the position information. The GPS antenna is an antenna that receives a positioning signal transmitted from a positioning satellite (also referred to as a GNSS satellite). The positioning module is a module that calculates position information based on a signal received by the GPS antenna.

The position information acquisition unit 105 also has a function of identifying a road segment that the vehicle 10 is currently traveling, by referring to the road map data 102B to be described later.

Next, the server apparatus 200 will be described.

The server apparatus 200 executes a process for collecting pieces of fuel efficiency information from a plurality of vehicles 10 (onboard apparatuses 100) and storing them into a database and a process for providing fuel efficiency information corresponding to a plurality of vehicles 10 that traveled a specified road segment in the past, in response to a request from the outside.

Figure 5:
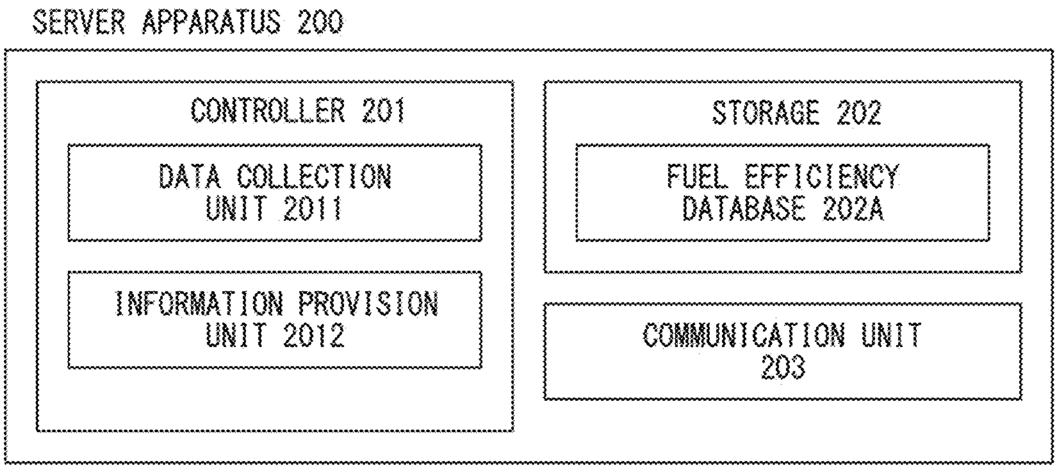
FIG. 5 is a diagram illustrating components of a server apparatus according to the embodiment.

FIG. 5 is a diagram illustrating components of the server apparatus 200 included in the vehicle system according to the present embodiment in detail.

The server apparatus 200 can be configured as a computer that includes processors such as a CPU and a GPU, main memories such as a RAM and a ROM, and auxiliary storage devices such as an EPROM, a hard disk drive, and a removable medium. In the auxiliary storage device, an operating system (OS), various kinds of programs, various kinds of tables, and the like are stored. Functions meeting predetermined purposes as described later can be realized by loading programs stored in the auxiliary storage device to a work area of the main memory, executing the programs, and ethe components and the like being controlled through the execution of the programs. A part or all of the functions, however, may be realized by a hardware circuit like an ASIC and an FPGA.

The server apparatus 200 is configured including a controller 201, a storage 202, and a communication unit 203.

The controller 201 is an operation device responsible for control performed by the server apparatus 200. The controller 201 can be realized by an operation processing device such as a CPU.

The controller 201 is configured including a data collection unit 2011 and an information provision unit 2012 as function modules. Each of the function modules may be realized by executing a stored program by the CPU.

The data collection unit 2011 executes a process for collecting pieces of fuel efficiency information from a plurality of vehicles 10 (onboard apparatuses 100) and storing them into a fuel efficiency database 202A to be described later.

When receiving pieces of fuel efficiency information from a plurality of vehicles 10 (onboard apparatuses 100), the data collection unit 2011 stores them into the fuel efficiency database 202A. The fuel efficiency database 202A is a database including columns similar to those illustrated in FIG. 3.

While the fuel efficiency database 102A stores fuel efficiency information about a particular vehicle, the fuel efficiency database 202A stores pieces of fuel efficiency information about a plurality of vehicles.

In response to a request from the onboard apparatus 100, the information provision unit 2012 extracts fuel efficiency information corresponding to a plurality of vehicles 10 that traveled a specified road segment in the past from the fuel efficiency database 202A and transmits it to the onboard apparatus 100.

Note that the onboard apparatus 100 that transmits the fuel efficiency information to the server apparatus 200 and the onboard apparatus 100 that requests the fuel efficiency information from the server apparatus 200 may be separate apparatuses.

The storage 202 is configured including a main memory and an auxiliary storage device. The main memory is a memory where a program executed by the controller 201 and data used by the control program are developed. The auxiliary storage device is a device in which the program executed by the controller 201 and the data used by the control program are stored.

Furthermore, the fuel efficiency database 202A is stored in the storage 202.

The fuel efficiency database 202A is a database in which fuel efficiency information (FIG. 3) transmitted from the onboard apparatus 100 is stored. In the fuel efficiency database 202A, a plurality of pieces of fuel efficiency information transmitted from the plurality of vehicles 10 (the onboard apparatuses 100) are stored.

The communication unit 203 is a communication interface for connecting the server apparatus 200 to a network. The communication unit 203 is configured, for example, including a network interface board and a wireless communication interface for wireless communication.

Note that the configurations illustrated in FIGS. 2 and 5 are mere examples, and all or a part of the illustrated functions may be executed with dedicatedly designed circuits. Furthermore, storage and execution of the program may be performed by a combination of a main memory and an auxiliary storage device other than the illustrated combination.

Figure 6:
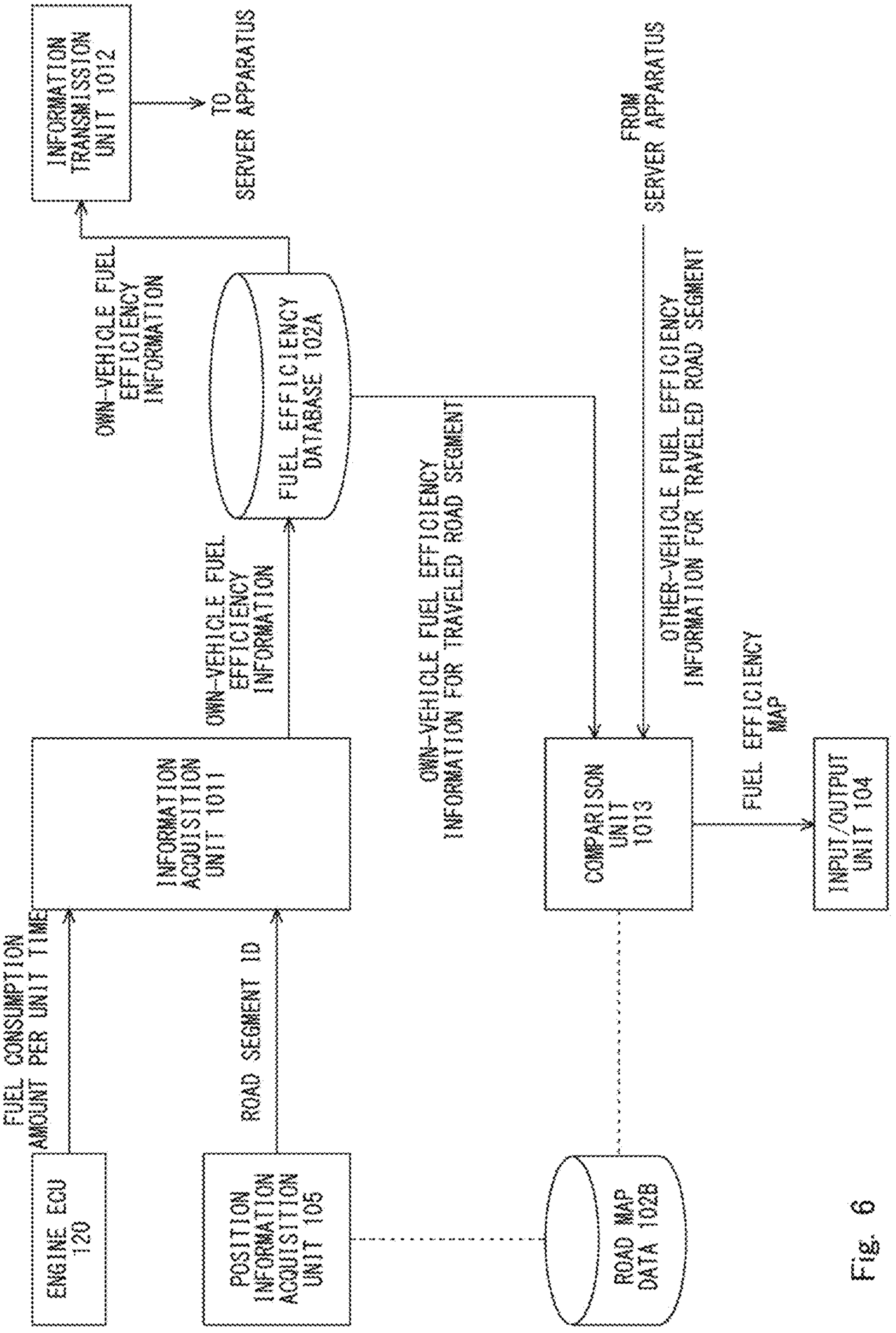
FIG. 6 is a diagram illustrating a flow of data in the onboard apparatus.

Next, specific content of the process performed by the onboard apparatus 100 will be described. FIG. 6 is a diagram illustrating a flow of data among components of the onboard apparatus 100.

While the vehicle 10 is traveling, the information acquisition unit 1011 periodically acquires data indicating a fuel consumption amount per unit time from the engine ECU 120. In parallel therewith, the information acquisition unit 1011 acquires information that identifies a road segment that the vehicle 10 is currently traveling (a road segment ID) from the position information acquisition unit 105. By collating the acquired position information with the road map data 102B, the position information acquisition unit 105 identifies the road segment that the vehicle 10 is currently traveling and provides the identifier of the road segment to the information acquisition unit 1011.

The information acquisition unit 1011 associates the acquired road segment with a total amount of fuel consumed in the road segment to generate fuel efficiency information (own-vehicle fuel efficiency information) as illustrated in FIG. 3. The generated own-vehicle fuel efficiency information is stored in the fuel efficiency database 102A.

In the fuel efficiency database 102A, a plurality of road segments through which the vehicle 10 has passed and amounts of fuel consumed in the road segments are accumulated in association with each other.

The own-vehicle fuel efficiency information stored in the fuel efficiency database 102A is transmitted to the server apparatus 200 at a predetermined timing by the information transmission unit 1012. The transmission timing may be a timing when the vehicle 10 transitions between road segments or may be a timing when traveling of the vehicle 10 ends (for example, at a timing when the vehicle system is shut down).

It is conceivable that the vehicle 10 stops in a particular segment for a long time. Fuel efficiency information obtained in such a case is not appropriate as data for comparing fuel efficiency. Therefore, if such a case occurs, corresponding own-vehicle fuel efficiency information may be excluded from transmission to the server apparatus 200. Furthermore, for this determination, the information acquisition unit 1011 may acquire data indicating a vehicle speed, a shift position, the state of the parking brake, or the like from the engine ECU 120.

The comparison unit 1013 starts operation at a timing of making a comparison of fuel efficiency.

The comparison of fuel efficiency may be made in response to an instruction by the occupant of the vehicle 10 or may be automatically performed at a timing when the vehicle 10 ends traveling.

Figure 7:
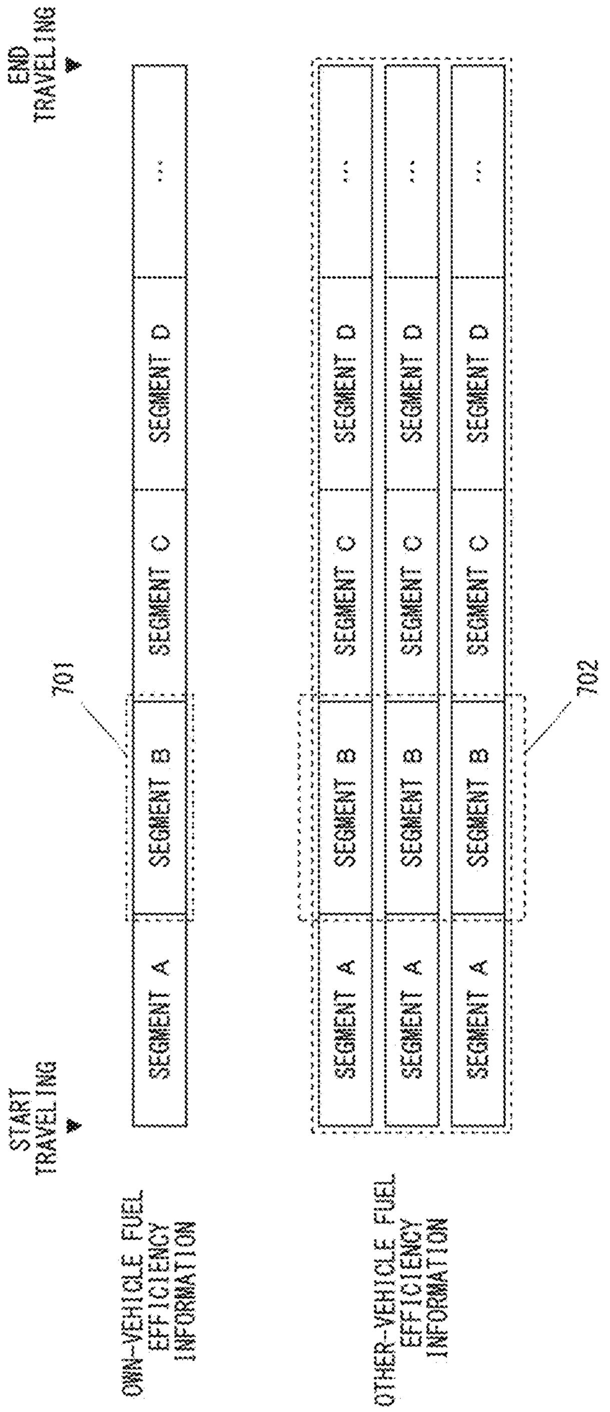
FIG. 7 is a diagram illustrating a method for comparing fuel efficiencies.

The comparison unit 1013 identifies the plurality of road segments that the vehicle 10 has traveled, and acquires pieces of own-vehicle fuel efficiency information corresponding to the plurality of road segments from the fuel efficiency database 102A. FIG. 7 is a diagram exemplifying the road segments that the vehicle 10 has traveled. Here, it is assumed that the vehicle 10 has traveled road segments A, B, C, and D in that order.

Furthermore, the comparison unit 1013 acquires other-vehicle fuel efficiency information corresponding to the same road segments from the server apparatus 200. Here, pieces of fuel efficiency information transmitted from other vehicles that traveled the same road segments are targeted by the acquisition. In the illustrated example, pieces of fuel efficiency information about other vehicles (other-vehicle fuel efficiency information) are acquired for each road, such as pieces of fuel efficiency information about a plurality of vehicles that traveled the road segment A, pieces of fuel efficiency information about a plurality of vehicles that traveled the road segment B, . . . . In the example of FIG. 7, it is assumed that three other vehicles traveled the same road segments.

It is desirable that the fuel efficiency information comparison is made using vehicles that travel with fuel consumption rates similar to the fuel consumption rate of the target vehicle 10. Therefore, it is desirable to acquire the other-vehicle fuel efficiency information from other vehicles having the same or similar vehicle attributes.

For example, the comparison unit 1013 may notify the server apparatus 200 of the attribute of the vehicle 10, and the server apparatus 200 may extract pieces of fuel efficiency information transmitted from vehicles 10 having attributes that are the same as or similar to the attribute to generate other-vehicle fuel efficiency information.

As the attribute of the vehicle 10, for example, vehicle type, model name, vehicle size, vehicle weight, vehicle capacity, fuel type, or drive method is exemplified. The server apparatus 200 can decide data to be extracted, by referring to the vehicle attribute field included in the fuel efficiency information stored in the fuel efficiency database 202A.

The comparison unit 1013 that has acquired the own-vehicle fuel efficiency information and the other-vehicle fuel efficiency information makes a comparison of fuel efficiency for each road segment. In the example of FIG. 7, a plurality of pieces of other-vehicle fuel efficiency information as indicated by reference sign 702 and the own-vehicle fuel efficiency information (reference sign 701) are compared. This process is executed for each road segment.

Here, methods for comparing the own-vehicle fuel efficiency information and the other-vehicle fuel efficiency information will be described.

(1) Method 1

As a typical method, there is a method of determining an average value of fuel consumption amounts of a plurality of other vehicles and comparing the average value with the fuel consumption amount of the own vehicle. For example, a case where N other vehicles $V_1$ to $V_N$ are traveling a certain road segment will be considered. The average value p of the fuel consumption amounts can be expressed by the following formula:

$$\mu=(C_{v1}+C_{v2}+C_{v3}+\ldots+C_{vN})/N$$

where, $C_{v1}$ to $C_{vN}$ are fuel consumption amounts of the vehicles in the road segment.

By calculating a rate of the fuel consumption amount of the own vehicle to the determined value, an evaluation value can be obtained. The evaluation value may be expressed by $\mu/C_{vs}$, where $C_{vs}$ is the fuel consumption amount of the own vehicle.

When the evaluation value obtained here is larger than 1, it can be determined that the fuel efficiency of the own vehicle is favorable in comparison with the other vehicles.

(2) Method 2

As one of the comparison methods, there is a method of determining the deviation value.

Specifically, the variance σ of the fuel consumption amounts $C_{v1}$ to $C_{vN}$ of the vehicles in the road segment is determined, and the deviation value of the fuel consumption amount of the own vehicle can be calculated based on the variance σ. In this example, the variation value is the evaluation value.

$$\sigma=\sqrt{\{(C_{v1}-\mu)^2+(C_{v2}-\mu)^2+\ldots+(C_{vN}-\mu)^2\}/(N-1)}$$

$$\text{Deviation value}=-\{(C_{vs}-\mu)/\sigma\}\times10+50$$

When the evaluation value obtained here is larger than 50, it can be determined that the fuel efficiency of the own vehicle is favorable in comparison with the other vehicles.

(3) Method 3

As another comparison method, there is a method of determining the percentile of the fuel consumption amount. That is, the fuel consumption amounts of the own vehicle and other vehicles and are arranged in order, and the evaluation value is calculated as the percentage position at which the own vehicle is located. Thereby, it is possible to know the rank of the own vehicle in the whole.

By executing the above process for each road segment, an evaluation value is obtained for each road segment through which the vehicle 10 has passed. FIG. 8 illustrates an example of evaluation values (for example, deviation values) calculated for road segments. The evaluation values may be ranked based on the evaluation values. In the present example, an example of ranking the evaluation values with A to E labels is illustrated. For example, A, B, C, D, and E can be assumed to indicate “very good”, “good”, “normal”, “bad”, and “very bad”, respectively.

When the evaluation values are calculated for the road segments, the comparison unit 1013 superimposes graphics on a road map based on the evaluation values.

Figure 9:
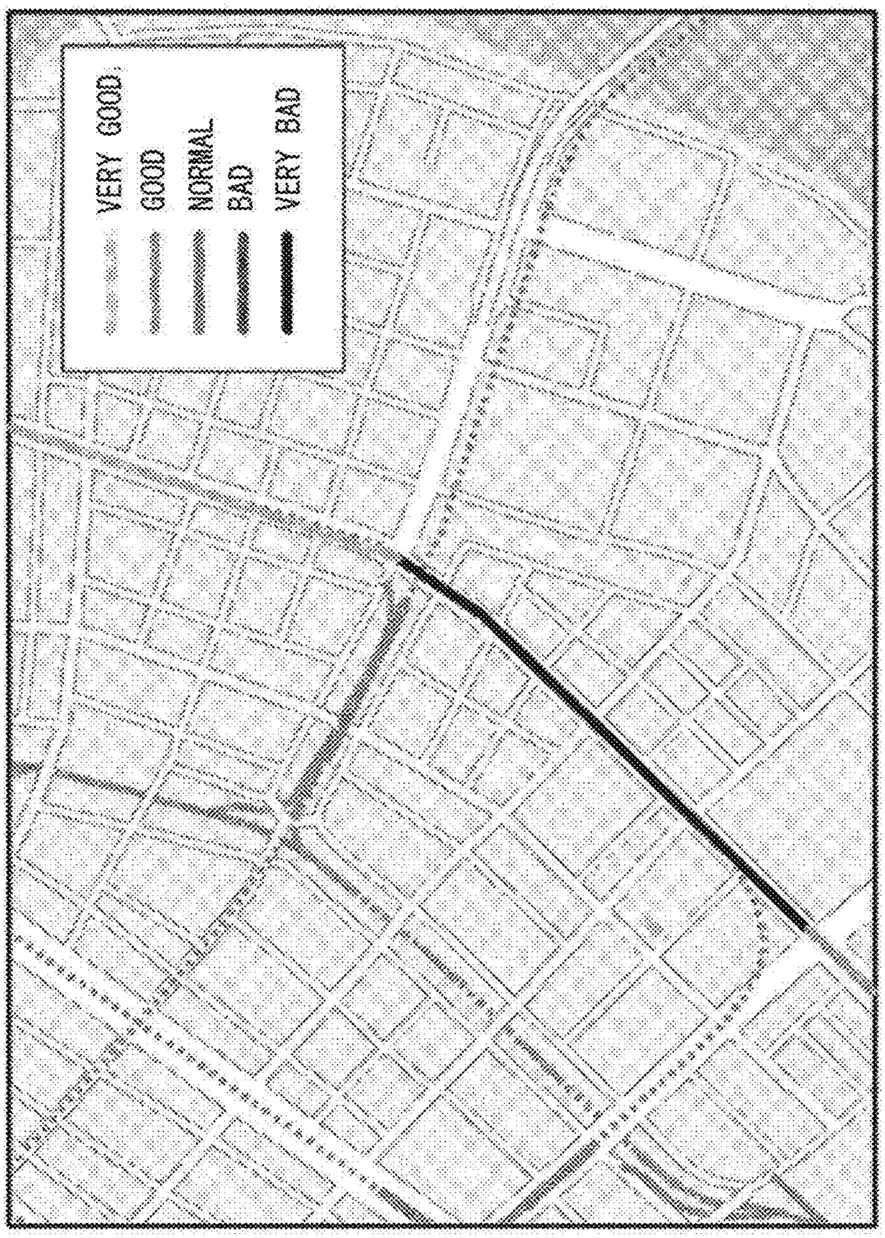
FIG. 9 illustrates an example of a fuel efficiency map generated by the onboard apparatus.

FIG. 9 illustrates an example of the road map (a fuel efficiency map) on which the graphics are superimposed. The fuel efficiency map includes the plurality of road segments through which the vehicle 10 has traveled. In the present example, the plurality of road segments included in the road map are colored according to the ranks. For example, a road segment for which a favorable fuel efficiency is obtained may be colored in warm color, and a road segment for which a favorable fuel efficiency is not obtained in cold color. In the example of FIG. 9, the ranks are indicated by shades.

Thereby, it becomes possible to grasp at which level the fuel efficiency of the own vehicle is in comparison with the other vehicles at a glance.

Figure 10:
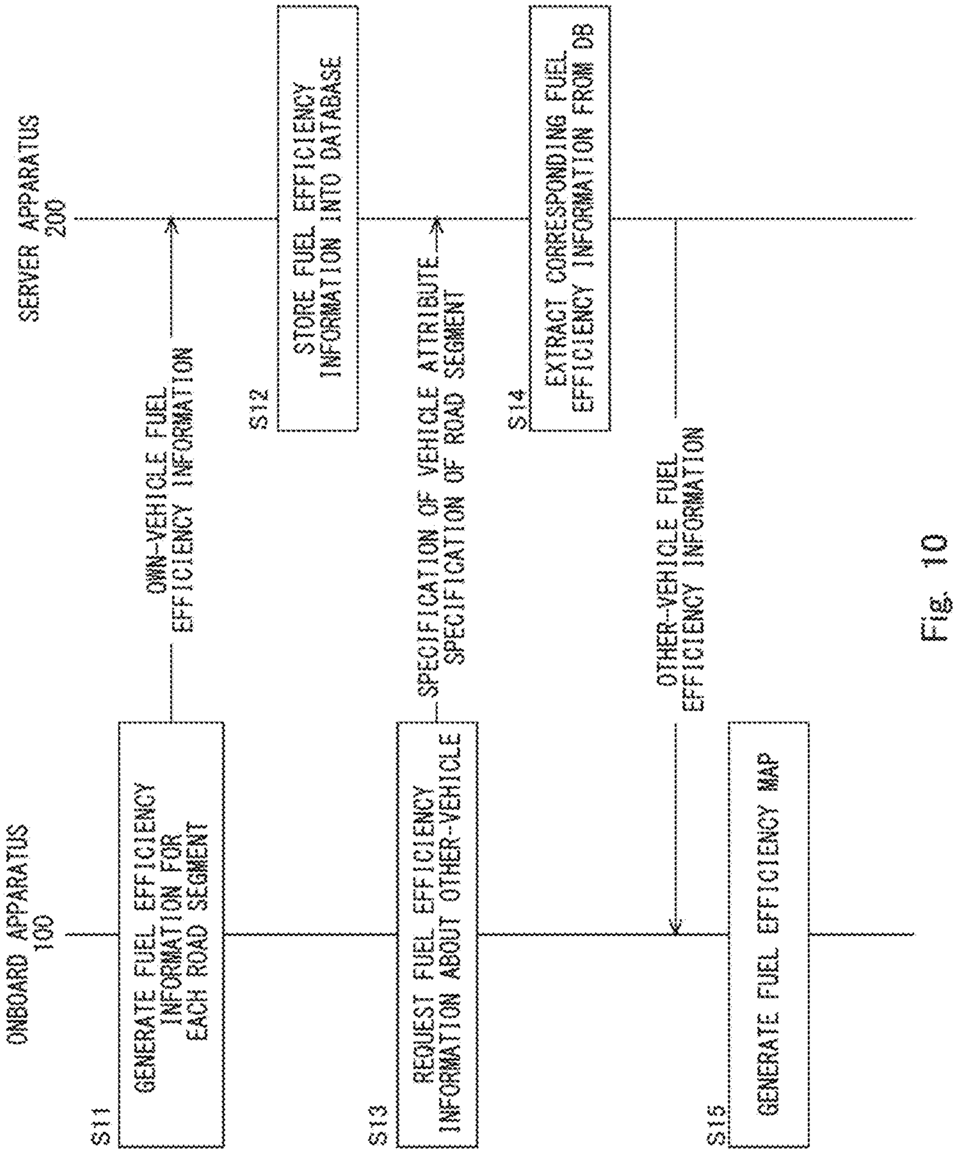
FIG. 10 is a sequence diagram illustrating a flow of data between the onboard apparatus and the server apparatus.

FIG. 10 is a diagram illustrating a flow of a process performed by the onboard apparatus 100 and the server apparatus 200 in the present embodiment.

First, at Step S11, the information acquisition unit 1011 generates own-vehicle fuel efficiency information. As described before, the information acquisition unit 1011 generates the fuel efficiency information as illustrated in FIG. 3 using a fuel consumption amount per unit time acquired from the engine ECU 120 and an identifier of a road segment acquired from the position information acquisition unit 105. The generated fuel efficiency information is stored into the fuel efficiency database 102A and transmitted to the server apparatus 200.

At step S12, the server apparatus 200 (the data collection unit 2011) stores the received fuel efficiency information into the fuel efficiency database 202A.

The processes of steps S11 and S12 are executed at a timing when the vehicle 10 leaves the road segment or at a timing when traveling of the vehicle 10 is completed.

When starting generation of a fuel efficiency map, at step S13, the onboard apparatus 100 requests fuel efficiency information about another vehicle from the server apparatus 200. At this step, the identifiers of the plurality of road segments through which the vehicle 10 has passed and information about the attribute of the vehicle 10 are transmitted to the server apparatus 200.

At step S14, the server apparatus 200 extracts fuel efficiency information about other vehicle that passed through the specified road segments. At the present step, fuel efficiency information transmitted from a vehicle having the specified attribute is targeted by the extraction. The fuel efficiency information (other-vehicle fuel efficiency information) extracted by the server apparatus 200 is transmitted to the onboard apparatus 100.

At step S15, the onboard apparatus 100 calculates evaluation values for the road segments, respectively, by the methods described before, based on the own-vehicle fuel efficiency information and the other-vehicle fuel efficiency information, and superimposes graphics on the road segments based on the evaluation values. Thereby, results of comparing the fuel efficiency of the own vehicle and the fuel efficiency of the other vehicle are mapped on the road map. The road map may be outputted to a display of the onboard apparatus 100 or may be transmitted to an apparatus associated with the occupant of the vehicle 10.

As described above, in the vehicle system according to the present embodiment, each of the plurality of vehicles 10 reports a fuel consumption amount in a road segment through which the vehicle 10 has passed, to the server apparatus 200, and the server apparatus 200 stores the fuel consumption amount. Stored fuel efficiency information is provided for the onboard apparatus 100 in response to a request, and the onboard apparatus 100 compares the fuel efficiency of the own vehicle and the fuel efficiency of the other vehicle based on the fuel efficiency information acquired from the server apparatus 200 and maps the result of the comparison on a road map. Thereby, it becomes possible for the user (for example, the driver) of the vehicle 10 to grasp whether their driving is appropriate in comparison with the other vehicle.

Furthermore, since the other vehicle targeted by the comparison is selected based on the attribute of the vehicle, comparison between vehicles having almost the same fuel consumption rates is possible.

(Modification 1 of First Embodiment)

In the first embodiment, the onboard apparatus 100 acquires fuel efficiency information about the own vehicle that has traveled a predetermined road segment and fuel efficiency information about a plurality of other vehicles that traveled the road segment, and performs calculation for comparing them. A part of the calculation for performing the comparison, however, may be executed in the server apparatus 200. For example, the average value of fuel consumption amounts illustrated in the method 1 and the variance of fuel consumption amounts illustrated in the method 2 may be calculated in the server apparatus 200. In this case, after extracting the other-vehicle fuel efficiency information at step S14, the server apparatus 200 may execute a process for performing such calculation and notifying the onboard apparatus 100 of the obtained value.

Furthermore, calculation and ranking of evaluation values may be executed by the server apparatus 200. For example, in the process of step S13, the onboard apparatus 100 may further notify the server apparatus 200 of own-vehicle fuel efficiency information, and the server apparatus 200 may perform calculation and ranking of evaluation values based on the notification.

In this case, the server apparatus 200 may transmit information indicating the evaluation values and ranks of road segments (information for generating a fuel efficiency map) to the onboard apparatus 100 instead of the other-vehicle fuel efficiency information. Furthermore, the onboard apparatus 100 that receives the information may generate the fuel efficiency map using the information.

Furthermore, though the onboard apparatus 100 associates each road segment with a fuel consumption amount in the first embodiment, the server apparatus 200 may associate each road segment with a fuel consumption amount. In this case, the onboard apparatus 100 generates fuel efficiency information that includes position information, instead of each road segment, and the server apparatus 200 may calculate an amount of fuel consumed in each road segment based on the position information.

(Modification 2 of First Embodiment)

Figure 11:
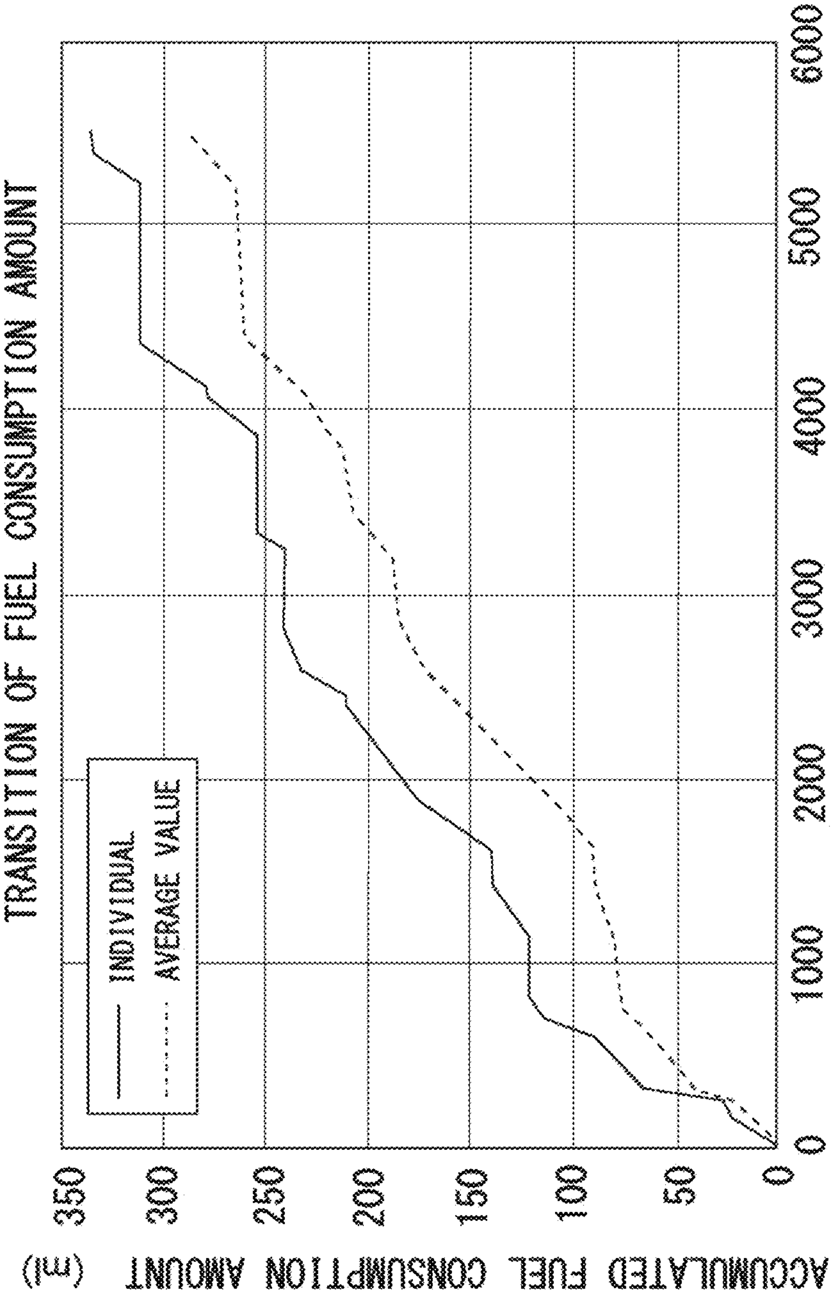
FIG. 11 illustrates an example of information provided at the same time with the fuel efficiency map.

Though the onboard apparatus 100 generates a fuel efficiency map as a result of comparing fuel efficiency in the first embodiment, the onboard apparatus 100 may graph transition of the fuel consumption amount in a route that the vehicle 10 has traveled. FIG. 11 illustrates an example of an image illustrating transition of the fuel consumption amount in a route that the vehicle 10 has traveled, using graphs. Such a graph can be obtained by accumulating fuel consumption amounts for a plurality of road segments included in the route that the vehicle 10 has traveled. On the graph, fuel consumption amount (average value) of other vehicles that traveled the same road segments may be plotted.

The onboard apparatus 100 may be configured to be capable of switching between the fuel efficiency map and the graph illustrated in FIG. 11. Furthermore, being triggered by any point on the graph being selected, the onboard apparatus 100 may display a corresponding road segment on the fuel efficiency map.

(Modification 3 of First Embodiment)

In the first embodiment, the server apparatus 200 extracts fuel efficiency information about other vehicles that passed through a specified road segment in the past, and the onboard apparatus 100 makes a comparison of fuel efficiency based on the fuel efficiency information. The accuracy of the comparison result, however, can vary depending on the number of other vehicles that traveled the road segment. For example, the accuracy of the comparison result for a road segment that ten vehicles travel a day and the comparison result for a road segment that three thousand vehicles travel a day are different. Therefore, the form of a graphic to be mapped on a road map may be decided based on the number of other vehicles used for comparison. For example, for a particular road segment, a thicker line may be superimposed as the number of other vehicles that passed during a predetermined period in the past is larger. Thereby, the accuracy of the comparison result can be intuitively indicated. Though line thickness is exemplified as the form of the graphic in the present example, the number of other vehicles used for comparison may be expressed otherwise.

(Modification 4 of First Embodiment)

Though an evaluation value is acquired as the result of comparing fuel efficiencies in the first embodiment, information such as "where in the whole the own vehicle is located" may be presented in order to encourage improvement of driving behavior.

Figure 12:
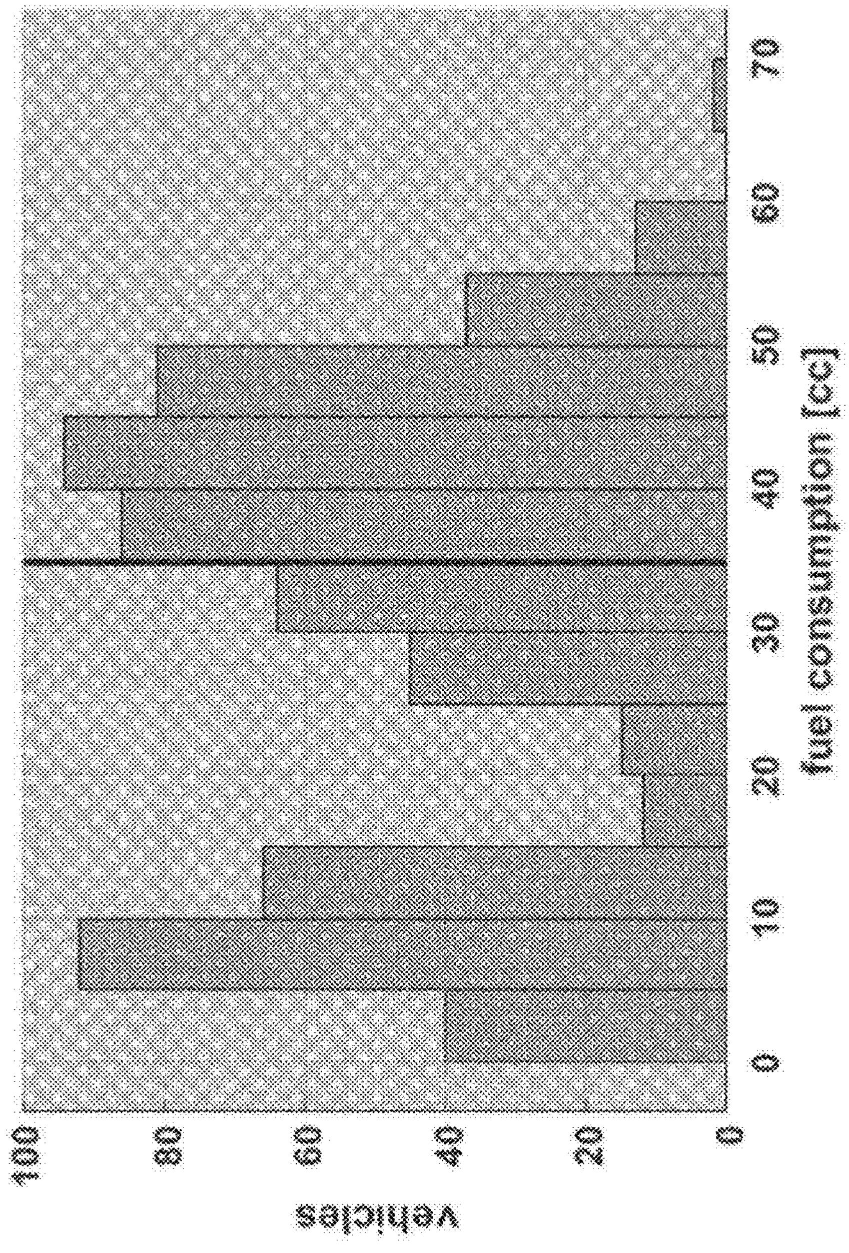
FIG. 12 illustrates an example of information provided at the same time with the fuel efficiency map.

For example, a fuel consumption amount histogram may be generated based on other-vehicle fuel efficiency information and outputted together with the position of the own vehicle. FIG. 12 illustrates an example of a histogram generated based on fuel consumption amounts of a plurality of other vehicles. The histogram can be generated based on own-vehicle fuel efficiency information and other-vehicle fuel efficiency information. Where in the histogram the own vehicle is located may be indicated, for example, by a marker. According to such a configuration, it becomes possible to easily grasp the position of the own vehicle in the whole.

(Modification 5 of First Embodiment)

In the first embodiment, at step S14, the server apparatus 200 extracts fuel efficiency information from the database with two keys of a vehicle attribute and a road segment. However, a fuel consumption amount in a certain road segment can significantly vary by a traffic jam situation and the like.

Therefore, in extracting fuel efficiency information at step S14, conditions such as day of the week, time zone, and date may be used. For example, a condition under which the vehicle 10 has traveled a target road segment, such as "between 18 and 19 p.m. on a weekday", may be specified to extract fuel efficiency information using the condition. The condition may be specified by the onboard apparatus 100 or may be automatically added by the server apparatus 200.

According to such a configuration, since it becomes possible to acquire fuel efficiency information about other vehicles that traveled under similar situations, the comparison accuracy can be improved.

Second Embodiment

In the first embodiment, fuel consumption amounts are compared for each road segment. That is, for example, when a certain road segment is an evaluation target, amounts of fuel consumed in the road segment are compared among vehicles.

However, when the distance of a road segment is short (for example, in the case of 100 m or shorter), there is a possibility that evaluation varies among the short sections, and the results are difficult to see. Therefore, in a second embodiment, a section for which a comparison is to be made is set longer than a road segment to be evaluated.

Figure 13A:
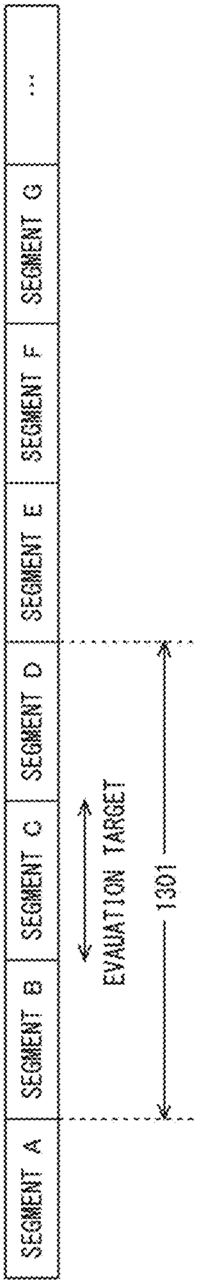
FIG. 13A illustrates an example of a method for comparing fuel efficiencies in a second embodiment.

FIG. 13A is a diagram illustrating a method for comparing fuel consumption amounts in the second embodiment.

In the first embodiment, for example, when a road segment C is an evaluation target, amounts of fuel consumed in the road segment C are compared. In comparison, in the second embodiment, a comparison is made between amounts of fuel consumed in a plurality of road segments including road segments before and after the road segment C to generate an evaluation of the road segment C.

In the present example, total amounts of fuel consumed in a section (reference sign 1301) of the three road segments B, C, and D are acquired to compare fuel efficiency of the own vehicle and the fuel efficiencies of other vehicles. The result of the comparison is associated with the road segment C, and mapping onto a road map is performed. That is, the result (an evaluation value) of a comparison made based on amounts of fuel consumed in the section indicated by reference sign 1301 is the evaluation of the road segment C.

According to such a configuration, since a comparison can be made based on moving averages of fuel consumption amounts, evaluation result variation is smoothed, and it is possible to obtain an effect that a road map after mapping is performed is easy to see.

Though a total of three road segments, including road segments immediately before and after an evaluation target road segment, is a section for which fuel consumption amounts are to be calculated in the example of FIG. 13A, borders between sections for which the fuel consumption amounts are to be calculated do not necessarily have to correspond to borders between road segments.

Figure 13B:
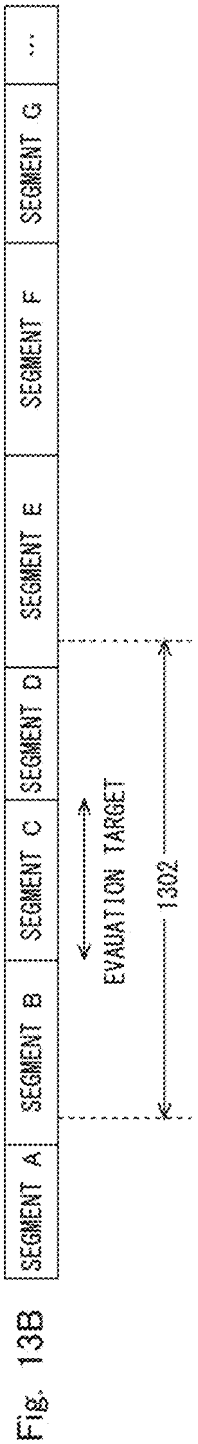
FIG. 13B illustrates the example of the method for comparing fuel efficiencies in a second embodiment.

For example, as in FIG. 13B, a section with a predetermined length (reference sign 1302) that is unrelated to road segments may be defined to make a comparison based on amounts of fuel consumed in the section. In this case, each of the fuel consumption amount in the section may be determined by proportionally dividing the fuel consumption amount of each road segment by the distance.

(Modifications)

The above embodiments are mere examples, and the present disclosure can be appropriately changed and practiced within a range not departing from its spirit.

For example, the processes and components described in the present disclosure can be freely combined and implemented as far as technical contradiction does not occur.

The fuel in the present disclosure may be volatile oil (such as gasoline and light oil), gas such as hydrogen, or liquid obtained by compressing the gas. Furthermore, though a consumption amount of gasoline is exemplified as fuel efficiency information in the description of the embodiments, when a target is an electric vehicle, it is possible to perform calculation using a consumption amount of power (power efficiency information).

Furthermore, a process described as being performed by single apparatus may be shared and executed by a plurality of apparatuses. In contrast, processes described as being performed by different apparatuses may be executed by single apparatus. In a computer system, what hardware configuration (server configuration) each function is realized by can be flexibly changed.

The present disclosure can be realized by supplying a computer program implemented with the functions described in the above embodiments to a computer and one or more processors of the computer reading out and executing the program. Such a computer program may be provided for the computer by a non-transitory computer-readable storage medium connectable to a system bus of the computer or may be provided for the computer via a network. As the non-transitory computer-readable storage medium, for example, any type of disk such as a magnetic disk (a floppy (registered trademark) disk, a hard disk drive (HDD), or the like), and an optical disc (a CD-ROM, a DVD disc, a Blu-ray disc, or the like), a read-only memory (ROM), a random-access memory (RAM), an EPROM, an EEPROM, a magnetic card, a flash memory, an optical card, and any type of medium that is appropriate for storing electronic commands are included.

What is claimed is:

1. An onboard apparatus comprising a central processing unit, the central processing unit being configured to execute:

identifying a plurality of road segments included in a route that a first vehicle has traveled;

acquiring first data about an amount of fuel or power consumed when the first vehicle passes through each road segment of the plurality of road segments;

acquiring second data about amounts of fuel or power consumed from a server when a plurality of second vehicles pass through each road segment of the plurality of road segments, the second data acquired from the plurality of second vehicles having the same or similar vehicle attributes as the first vehicle;

generating a result of comparing the fuel or power consumption amounts in each of the plurality of road segments, between the first vehicle and the plurality of second vehicles, based on the first and second data, and mapping the result of the comparison on the corresponding road segment of the plurality of road segments on a road map according to a fuel or power efficiency ranking; and displaying, on the road map, an overlay of a graphic according to the result of the comparison such that at least one of the plurality of road segments through which the first vehicle has traveled is colored according to the fuel or power efficiency ranking.

2. The onboard apparatus according to claim 1, wherein the central processing unit determines a deviation or a percentile of the fuel or power consumption amount of the first vehicle relative to the fuel or power consumption amounts of the plurality of second vehicles as the result of the comparison.

3. The onboard apparatus according to claim 1, wherein the second data includes an average value of the fuel or power consumption amounts of the plurality of second vehicles in each road segment of the plurality of road segments.

4. The onboard apparatus according to claim 1, wherein the plurality of second vehicles are vehicles that traveled each road segment of the plurality of road segments under a same situation as the first vehicle.

5. The onboard apparatus according to claim 1, wherein the graphic is a figure in a shape that overlaps with each road segment of the plurality of road segments on the road map.

6. The onboard apparatus according to claim 1, wherein the central processing unit decides color of the graphic based on whether the fuel or power consumption amount of the first vehicle is larger or smaller in comparison with the plurality of second vehicles.

7. The onboard apparatus according to claim 1, wherein the central processing unit decides a display form of the graphic based on a number of second vehicles, among the plurality of second vehicles, that traveled each road segment of the plurality of road segments during a predetermined period.

8. The onboard apparatus according to claim 1, wherein the central processing unit compares amounts of fuel or power consumed in a section with a predetermined length including a second road segment of the plurality of road segments, between the first vehicle and the plurality of second vehicles, and maps a result of the comparison on the second road segment on the road map as a result of a comparison about the second road segment.

9. An onboard apparatus comprising a central processing unit, the central processing unit being configured to execute:

acquiring, from each of a plurality of vehicles, first data indicating a position of each vehicle and second data about an amount of fuel or power consumed by each vehicle, the second data acquired from the plurality of vehicles having the same or similar vehicle attributes, and storing the first and second data into a database;

accepting a specification of one or more first road segments from a first apparatus associated with the first vehicle;

extracting, from the database, third data about an amount of fuel or power consumed by a second vehicle in the one or more first road segments, and transmitting the third data to the first apparatus;

generating a result of comparing the fuel or power consumption amounts in each of the one or more first road segments, between the plurality of vehicles, based on the first and second data, and mapping the result of the comparison on the corresponding one or more first road segments on a road map according to a fuel or power efficiency ranking; and displaying, on the road map, an overlay of a graphic according to the result of the comparison such that the one or more first road segments through which the first vehicle has traveled is colored according to the fuel or power efficiency ranking.

10. The onboard apparatus according to claim 9, wherein the third data includes an average value of fuel or power consumption amounts of a plurality of the second vehicles that passed through the one or more first road segments.

11. The onboard apparatus according to claim 9, wherein the second vehicle is a vehicle having a predetermined attribute.

12. The onboard apparatus according to claim 11, wherein the central processing unit further accepts a specification of the predetermined attribute from the first apparatus.

13. The onboard apparatus according to claim 9, wherein the second vehicle is a vehicle that passed through the one or more first road segments under a predetermined condition.

14. The onboard apparatus according to claim 13, wherein the central processing unit further accepts a specification of the predetermined condition from the first apparatus.

15. An information processing method to be executed by a computer, comprising:

identifying a plurality of road segments included in a route that a first vehicle has traveled;

acquiring first data about an amount of fuel or power consumed when the first vehicle passes through each road segment of the plurality of road segments;

acquiring second data about amounts of fuel or power consumed when the plurality of second vehicles pass through each road segment of the plurality of road segments, the second data acquired from the plurality of second vehicles having the same or similar vehicle attributes as the first vehicle;

generating a result of comparing the fuel or power consumption amounts in each of the plurality of road segments, between the first vehicle and the plurality of second vehicles, based on the first and second data, and mapping the result of the comparison on the corresponding segment of the plurality of road segments on a road map according to a fuel or power efficiency ranking; and displaying, on the road map, an overlay of a graphic according to the result of the comparison such that at least one of the plurality of road segments through which the first vehicle has traveled is colored according to the fuel or power efficiency ranking.

* * * * *